United States Patent [19]

Tanaka et al.

[11] Patent Number: 5,787,356
[45] Date of Patent: Jul. 28, 1998

[54] CORDLESS TELEPHONE SYSTEM AND GENERATION METHOD OF A UNIQUE WORD THEREOF

[75] Inventors: Kiyoshi Tanaka, Chiba; Katsuhiko Otsuji, Kawasaki, both of Japan

[73] Assignee: Uniden Corporation, Chiba, Japan

[21] Appl. No.: 878,073

[22] Filed: Jun. 18, 1997

Related U.S. Application Data

[63] Continuation of Ser. No. 305,935, Sep. 19, 1994, abandoned.

[30] Foreign Application Priority Data

Dec. 14, 1993 [JP] Japan ................................. 5-342607

[51] Int. Cl.⁶ .......................................................... H04Q 7/24
[52] U.S. Cl. .......................... 455/464; 455/450; 370/514
[58] Field of Search ........................................ 455/454, 450, 455/462, 464, 403, 410, 411; 370/337, 347, 350, 509, 514; 375/365

[56] References Cited

U.S. PATENT DOCUMENTS

| | | | |
|---|---|---|---|
| 4,964,163 | 10/1990 | Berry | 380/12 |
| 4,979,205 | 12/1990 | Haraguchi et al. | 379/61 |
| 5,046,081 | 9/1991 | Umemoto | 379/58 |

*Primary Examiner*—Dwayne D. Bost
*Assistant Examiner*—William G. Trost
*Attorney, Agent, or Firm*—McDermott, Will & Emery

[57] ABSTRACT

This invention provides a cordless telephone system in which communication is executed between a master phone and a slave phone, said master phone and said slave phone respectively comprising a memory section for storing ID code indicating that the master phone and slave phone forms a pair, a unique word generation means for generating a unique word corresponding in a form of 1 vs 1 to ID code using the ID code stored in the memory section, and a communication control means for simultaneously checking communication frame synchronism and a communication partner.

11 Claims, 7 Drawing Sheets

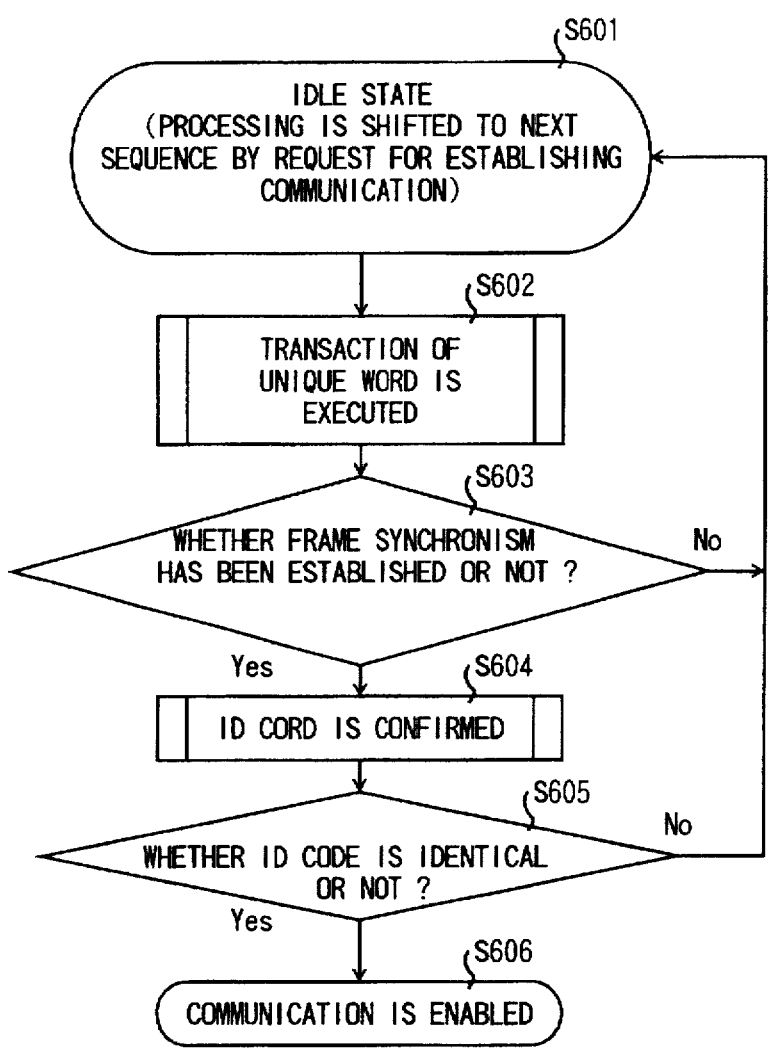

CORDLESS TELEPHONE SYSTEM AND GENERATION METHOD OF A UNIQUE WORD THEREOF

This application is a continuation of application Ser. No. 08/305,935 filed Sep. 19, 1994, now abandoned.

FIELD OF THE INVENTION

The present invention relates to a cordless telephone system enabling communication between a master phone and a slave phone, and more particularly to a cordless telephone system and generation method of a unique word thereof efficiently allowing frame synchronism between a master phone and a slave phone as well as recognition of a communication partner.

BACKGROUND OF THE INVENTION

Conventionally in communication between a master phone and a slave phone in a cordless telephone system, a unique word has been used for communication frame synchronization. A unique word is generally code specific to a system, and single code is used in the same system, so that different code is not used for each cordless phone.

FIG. 6 shows a process flow until communication between a master phone and a slave phone in a conventional type of cordless telephone system is enabled, and at first when a request for establishing communication is generated in an idle state (S601) where communication has not been established yet, a master phone and a slave phone send and receive a unique word to and from each other, and if the unique word coincide with each other, frame synchronism is successfully established (S602).

Then whether frame synchronism has successfully been established or not is checked (S603), and if not established, system control returns to an idle state in step S601. On the other hand, if established, ID code indicating that the master phone and the slave phone form a pair is transacted between them to confirm the ID code, and it is confirmed that they form a pair (namely they are a master phone and a slave phone in the same telephone system) (S604).

Then whether the ID code is identical or not is determined (S605), and if the ID code is identical, communication is enabled (S606). If the ID code is not identical, system control returns to the idle state in step S601.

As shown in the process flow above, as frame synchronization is executed according to a unique word to identify a communication partner, it is possible for communication to be always correctly executed between particular phones (a master phone and a particular slave phone), thus miss accounting and interference being suppressed. This particular range is called communication sphere.

For this reason to execute communication between a master phone and a slave phone, the slave phone must be within the communication sphere described above. So in the conventional type of cordless telephone system, as shown in FIG. 7A and in FIG. 7B, outer detection is executed between a master phone and a slave phone to check whether the salve phone is within a communication area (sphere) or not.

FIG. 7A shows a sequence for outer detection in the side of a slave phone when a master phone periodically sends an alert signal, wherein the slave phone executes a received alert signal checking (S701), determines whether an alert signal has been received or not (S702), and if an alert signal has been received, it is determined that the slave phone is within the communication sphere (S703), and if an alert signal has not been received, it is determined that the salve phone is outside of the communication sphere (S704).

FIG. 7B shows a process flow for outer detection in a case where a master phone does not send an alert signal, and in this case like in the process flow, as shown in FIG. 6, until communication between a slave phone and a slave phone is established, unique word transaction is executed (S705), frame synchronism is established (S706), ID code checking is executed (S707), whether the ID code is identical or not is checked (S708), it is determined that the salve phone is within the communication sphere if the ID code is identical (S709), and it is determined that the salve phone is outside of the communication sphere if frame synchronism has not been established successfully (S710).

However, in the conventional type of cordless telephone system, to establish communication between a master phone and a slave phone, frame synchronism is established with a unique word and then furthermore identification of an ID code is executed, and for this reason an operation for establishing frame synchronism or an operation for identifying ID code is required for a communication partner having different ID code, and as a result time for transaction of additional electric waves is required, so that power for a slave phone is wasted and a service life of the slave phone becomes disadvantageously shorter.

Especially a long time is required for identification of ID code, and if there are a plurality of cordless phones each having different ID code within a communication sphere, a long time is required until communication is established.

Also as a master phone and a slave phone are required to have a common unique word as well as common ID code, a memory capacity for storing the unique word and ID code is required.

Furthermore in a cordless telephone system using an outer detection sequence in a case shown in FIG. 7B where the slave phone does not send an alert signal, identification of ID code is executed after frame synchronism has been established with a unique word, and for the same reasons as described above there occur such disadvantageous problems as that a longer processing time is required for outer detection, or that a service life of a slave phone becomes disadvantageously shorter.

SUMMARY OF THE INVENTION

It is a first object of the present invention to reduce power consumption in a slave phone and make longer the slave phone's service life as well as to make shorter a time required until communication is established by eliminating the necessity of an operation for identifying ID code requiring transaction of additional electric waves.

It is a second object of the present invention to reduce a memory capacity required for storing a unique word and ID code.

It is a third object of the present invention to reduce a time required for processing signals for outer detection.

In the cordless telephone system and generation method of a unique word thereof according to the present invention, a unique word corresponding in a form of 1 vs 1 to ID code being stored in a storage means is generated by a unique work generating means, and synchronism of communication frame and a communication partner are identified simultaneously by a communication control means using the generated unique word, so that an operation required for identifying ID code can be eliminated.

Other objects and features of this invention will become understood from the following description with reference to the accompanying drawings.

BRIEF DESCRIPTION OF THE DRAWINGS

FIG. 6 is an explanatory view for illustrating a processing sequence until communication between a master phone and a slave phone is established in a conventional type of cordless telephone system;

DESCRIPTION OF THE PREFERRED EMBODIMENTS

Detailed description is made hereinafter for an embodiment of the cordless telephone system according to the present invention with reference to the related drawings.

Figure 1:
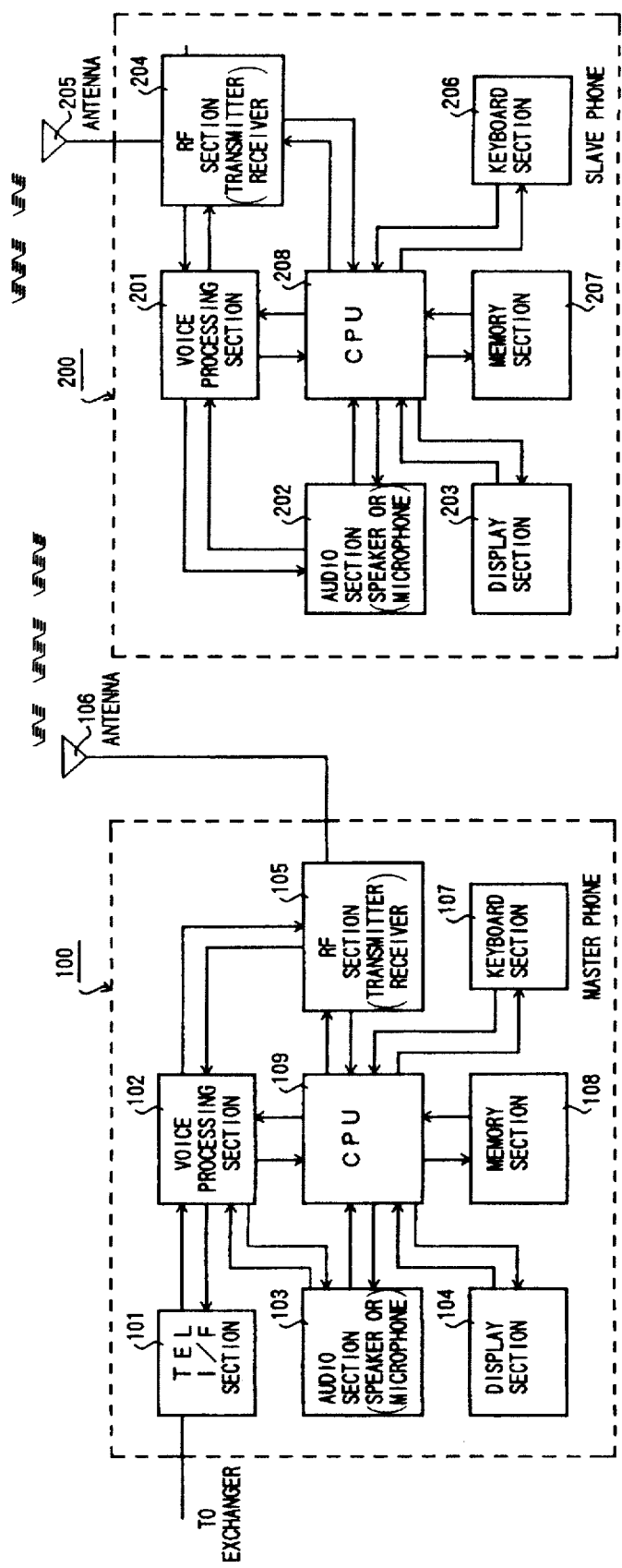
FIG. 1 is a block diagram of a cordless telephone system according to an embodiment of the present invention.

FIG. 1 is a block diagram illustrating the cordless telephone system according to the present invention, and this cordless telephone system comprises a master phone 100 with n-bit (for instance, 10 bits) ID code stored in a memory incorporated therein and a slave phone 200 with ID code ID#K stored in a memory incorporated therein.

The master phone 100 comprises a TELI/F section 101 interfacing with an switch (not shown herein) in a public telephone line, a speech processing section 102 such as a CODEC, an audio section such as a speaker or a microphone, a display section 104 comprising an LED and other components, an RF section comprising a transmitter/receiver for sending and receiving electric waves, an antenna 106 connected to the RF section 105, a keyboard section 107 for such operations as ten-key input, a memory section 108 to store ID code ID#K therein, and a CPU 109 to control each of the above sections.

The slave phone 200 comprises a speech processing section 201 such as CODEC, an audio section 202 such as a speaker or a microphone, a display section 203 comprising such components as an LED, an RF section 204 comprising a transmitter/receiver for sending and receiving electric waves, an antenna 205 connected to the RF section 204, a keyboard section 206 for such operations as ten-key input, a memory section 207 to store a communication program or ID code ID#K, and a CPU 208 for controlling each of the above sections, such as a CORDLESS TELEPHONE MODEL: EXP9100 and its Service Information Manual, made by Uniden Corporation and Sold by Uniden America Corporation, of which disclosure is incorporated herein by the references.

With the configuration described above, now description is made for ① a unique word preparation sequence, ② a processing sequence and protocol for establishing communication, and ③ a sequence for outer detection.

① Unique word preparation sequence

A cordless telephone according to the present invention generates a unique word UW#K corresponding in a form of 1 vs 1 to each ID code ID#K in the master phone 100 as well as in the slave phone 200 using the ID#K stored in the memory sections 108, 207. Especially in this embodiment, a unique word UW#K is generated by using the ID code ID#K and a particular polynomial for code generation.

Figure 2:
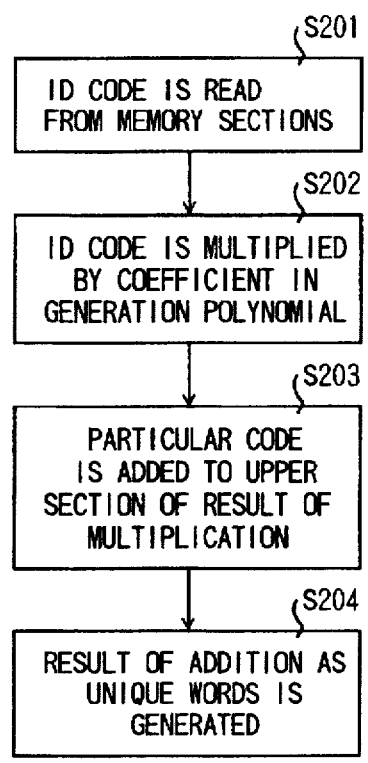
FIG. 2 is an explanatory view for illustrating a sequence for generating a unique word UW#K to be executed by a CPU in this embodiment.

FIG. 2 shows a sequence of generation of a unique word UW#K executed by the CPUs 109, 208, and each of the CPUs 109, 208 at first reads ID code ID#K from the memory sections 108, 207 (S201), then multiplies the ID code ID#K by a coefficient in the generation polynomial (S202), adds a particular code (code specified previously) to the upper section of result of multiplication (S203), and generates the result of addition as a unique words UW#K (S204).

Concretely in a case where , for instance, the equation of $G(x)=x^6+x+1$ is set up as a generation polynomial and 10-bit data of "1001101101", is stored in the memory sections 108, 207 as ID code ID#K, the CPU 109 and CPU 208 multiplies a coefficient in the generation polynomial by the ID code ID#K as shown in Equation 1, then adds particular code (herein 7-bit "1000101") to the result of multiplication to generate a 23-bit unique word UW#K.

```
     1001101101     NNNN   ID#K
  ×     1000011     NNNN   Coefficient in generation
     1001101101            polynomial
    1001101101
  1001101101
 1010001010000111   NNNN   result of multiplication
```

Then particular code is added to the upper section of the result of multiplication to generate UW#K.

```
1000101 ———————▶  101000101000011
Particular code    Result of multiplication
As a result:
UW#K = 10001011010001010000111
```

The unique word thus generated has a capability to correct an error for a certain number of bits (for instance, 2-bit error correction capability).

Also as the unique word UW#K was generated by the generation polynomial G (x), only one unique word is generated in a form of 1 vs 1 correspondence from one piece of ID code, and unique words generated from different ID code never coincide with each other. In the words, if the unique words generated in a master phone coincides with that generated in a slave phone, it indicates that the ID code ID#K used for generation of the unique word is identical. So when the unique word UW#K is identical, it is not necessary to execute ID code verification.

Also the unique word UW#K is generated by using ID code and adding particular code (particular additional code) to a result of multiplication (first code) corresponding to the ID code in a form of 1 vs 1 correspondence, so that the probability of mistake in unique word detection can be reduced.

② Processing sequence and protocol for establishing communication

Figure 3:
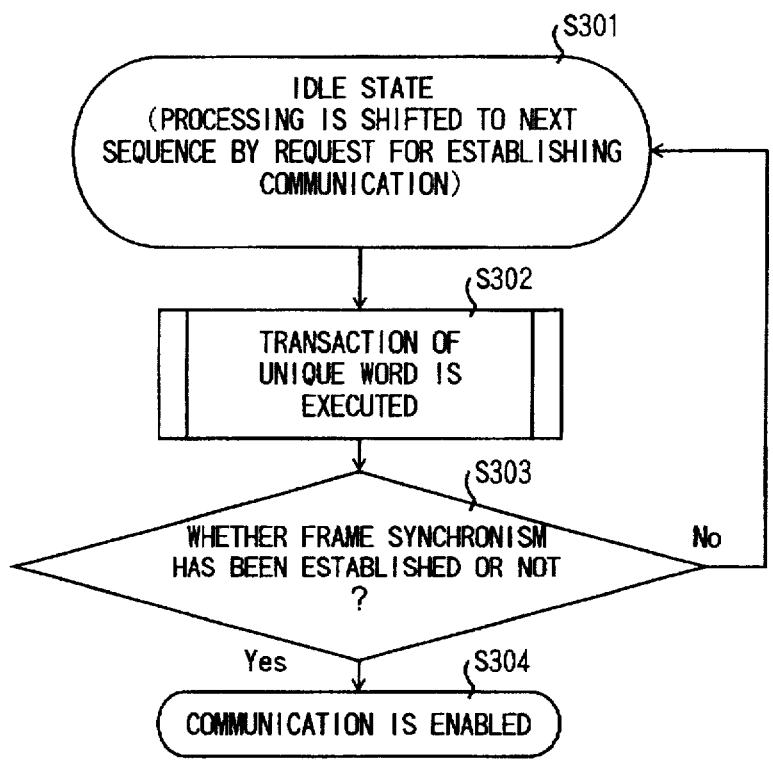
FIG. 3 is an explanatory view illustrating a processing sequence for establishing communication in the present embodiment.

Next description is made for a processing sequence and protocol for establishing communication by using the unique word UW#K generated as described above. FIG. 3 shows a processing sequence for establishing communication in this embodiment, and in this embodiment when a request for establishment of communication is generated in an idle state (S301) where communication has not been established, transaction of the unique word UW#K is executed between the master phone 100 and slave phone 200, and if the unique word UW#K is identical, frame synchronism is successfully established (S302).

The determination as to whether frame synchronism has been established or not is executed (S303), and if not established, system control returns to the idle state in step S301. If established, it indicates that the ID code ID#K is identical and that the master phone 100 and the slave phone 200 forms a pair (namely they are a master phone and a slave phone in the same system), and communication is enabled (S304).

As described above, in this processing sequence confirmation of frame synchronism and that of ID code UW#K are simultaneously executed with the unique word UW#K, and for this reason it is not necessary to send or receive electric waves especially for confirmation of ID code, and communication can be established within a short period of time.

Figure 4:
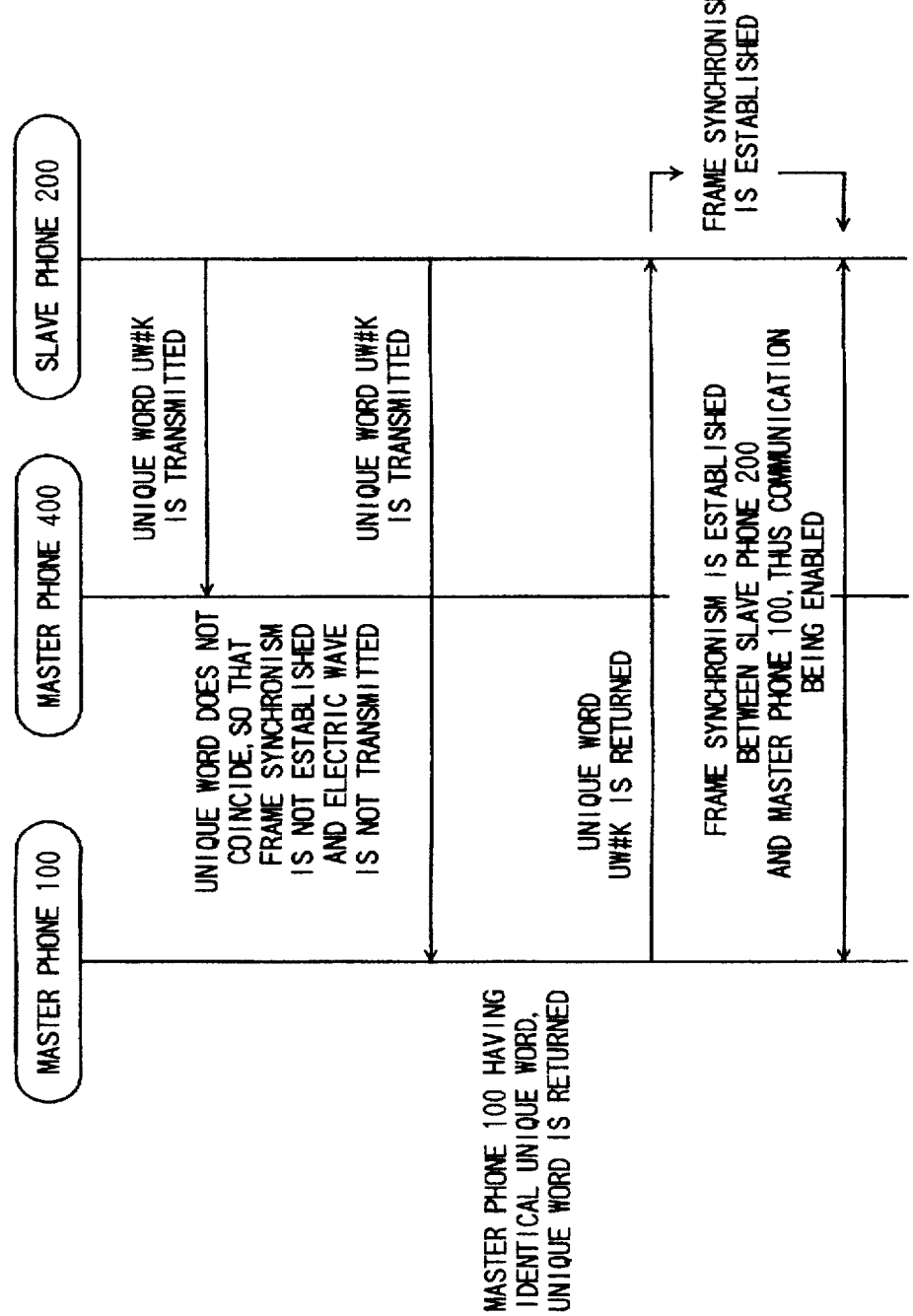
FIG. 4 is an explanatory view illustrating a protocol in a case where a unique word UW#K is sent from a slave phone.

FIG. 4 shows a protocol in a case when the UW#K is sent from the slave phone 200, and a communication partner having the same unique word as the unique word UW#K sent from the salve phone 200 is the master phone 100 having the same ID code as the ID code IS#K in the slave phone 200, and the unique word does not coincide with that in any master phone (for instance, master phone 400) for other than the master phone 100, so that frame synchronism is not established and electric wave is not sent. On the other hand, to the master phone 100 having the identical unique word, the unique word UW#K is returned. With this operation, frame synchronism is established between the slave phone 200 and the master phone 100, thus communication being enabled.

③ Sequence for outer detection

Outer detection is executed by making a determination as to whether the slave phone 200 is within a communication area (sphere) of the master phone 100 by means of periodically sending the unique word UW#K generated from the ID code ID#K from the slave phone 200 and making a determination as to whether frame synchronism is established within a certain period of time or not.

Figure 5:
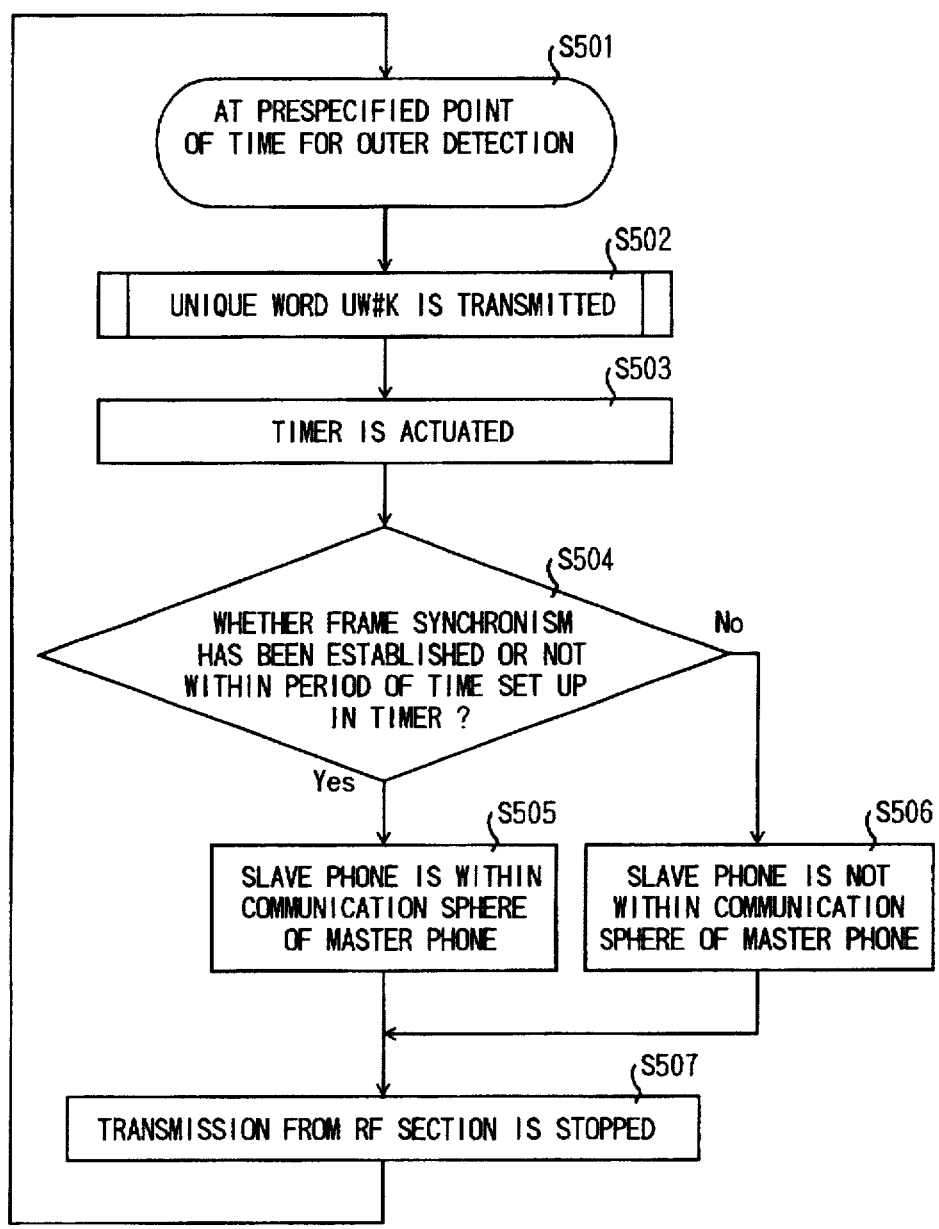
FIG. 5 is an explanatory view for illustrating an outer detection sequence in the present embodiment.
Figure 7A:
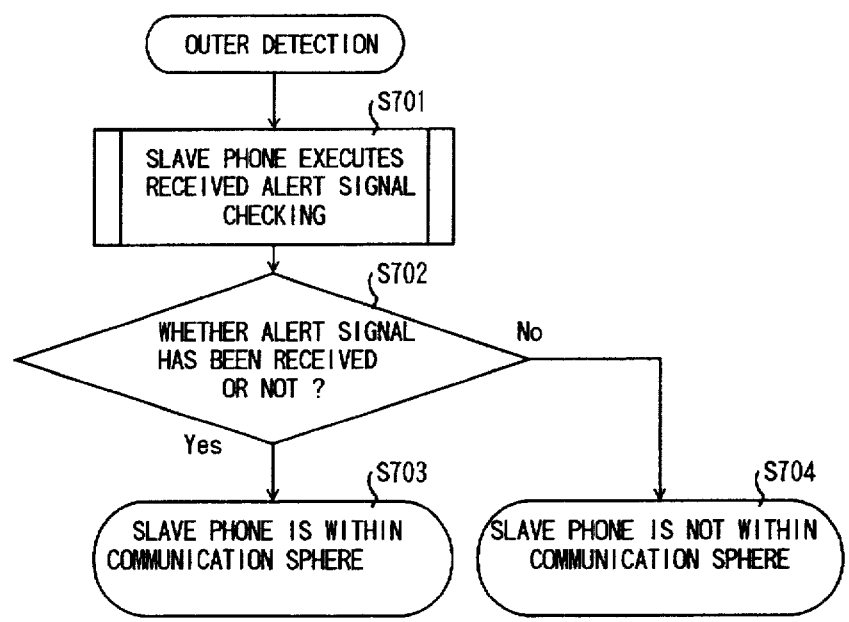
FIG. 7A is an explanatory view for illustrating a processing sequence for outer detection in a slave phone in a case where a master phone periodically sends an alert signal to a slave phone.
Figure 7B:
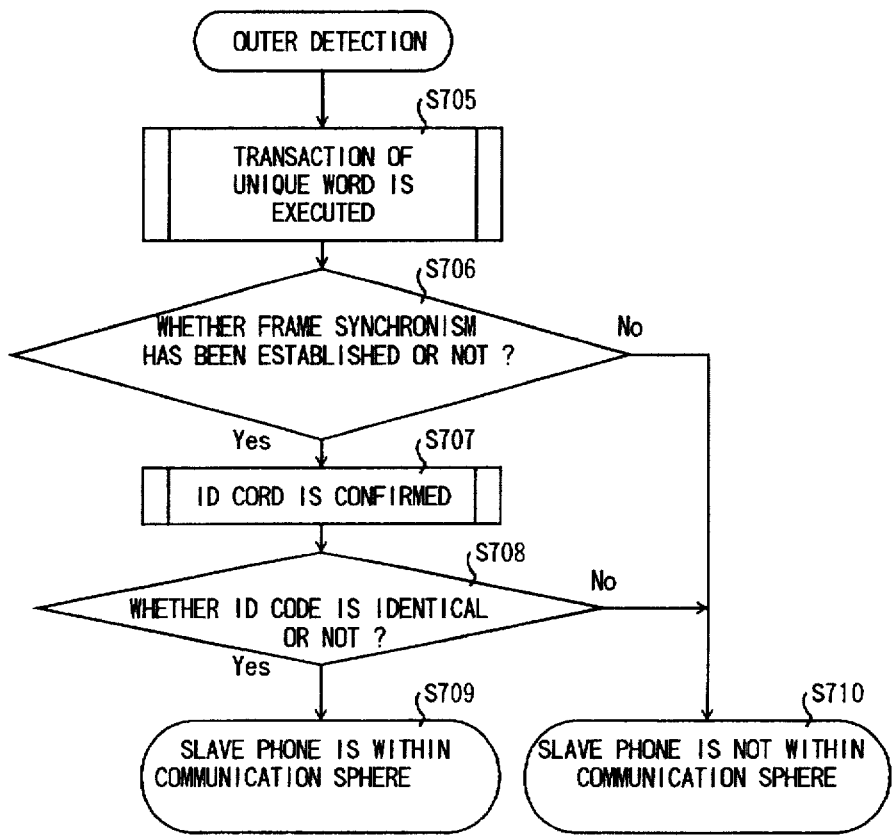
FIG. 7B is an explanatory view for illustrating a processing sequence for outer detection in a case where a master phone does not send an alert signal.

FIG. 5 shows a sequence for outer detection in this embodiment, and at a prespecified point of time for outer detection (S501), the CPU 208 in the slave phone 200 sends the unique word UW#K (S502), and actuates a timer (not shown) (S503). Then determination as to whether the unique word UW#K is returned or not from the master phone 100 within a period of time set up in the timer is executed to check that frame synchronism has been established or not (S504), and if frame synchronism has been established, it is determined that the slave phone 200 is within a communication sphere of the master phone 100 (S505), and transmission for the RF section 204 is stopped (S507). On the other hand, if frame synchronism is not established within the specified period of time in the timer, it is determined that the slave 200 is outside the communication sphere of the master phone 100 (S506), and transmission from the RF section 204 is stopped (S507).

In the processing sequence, an operation for establishing frame synchronism is not executed to a communication partner having different ID code, and as a result the necessity of sending or receiving unnecessary electric waves is eliminated, and outer detection can be achieved with communication requiring an extremely short period of time, so that power consumption for outer detection can be reduced.

As described above, in this embodiment, an operation for establishing frame synchronism is not executed to a communication partner having different ID code, and as a result the necessity of sending or receiving unnecessary electric waves is eliminated, so that electric waves can be used effectively and efficiently. Also as outer detection can be executed with communication requiring only an extremely short period of time, so that power consumption for outer detection can be reduced, and especially the remarkable effect of making a service life of a slave machine longer is provided.

As described above, the cordless telephone system and generation method of a unique word thereof according to the present invention is a cordless telephone system in which communication be executed between a master phone and a slave phone, said master phone and said slave phone comprising a storage means in which ID code indicating that the master phone and the salve phone form a pair is stored, a unique word generation means for generating a unique word corresponding in a form of 1 vs 1 correspondence to ID code using the ID code stored in the storage means described above, and a communication control means for simultaneously confirming communication frame synchronism and a communication partner using the unique word generated by the unique word generation means respectively, and for this reason the necessity of checking ID code as well as sending or receiving unnecessary electric waves is eliminated, which in turn makes it possible to reduce power consumption in a slave phone, to make a service life of the salve phone longer, and to reduce a time required until communication is enabled. Also a memory capacity required for storing a unique word and ID code can be reduced. Furthermore a time required for outer detection can be reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cordless telephone system in which communication is executed between a master phone and a slave phone, said master phone and said slave phone respectively comprising:

a memory for storing an ID code indicating that said master phone and said slave phone form a pair;

a unique word generator in each of said master and slave phones for independently generating a unique word based on a prescribed correspondence to said ID code stored in said memory; and a communication controller for simultaneously checking an ID code of either one of said master phone and said slave phone and establishing communication frame synchronism with the other one of said master phone and said slave phone using said unique word.

2. The cordless telephone system according to claim 1, wherein said communication controller does not communicate with said either one of said master phone and said slave phone having a unique word which is not identical to said unique word.

3. The cordless telephone system according to claim 1, wherein said unique word generator generates a unique word using said ID code and a prescribed generation polynomial specified previously.

4. The cordless telephone system according to claim 3, wherein said prescribed generation polynomial (G(x)) is $G(x)=x^6+x+1$.

5. The cordless telephone system according to claim 1, wherein said communication controller in said slave phone periodically determines as to whether frame synchronism with said master phone is established or not, and said communication controller also determines that said slave phone is within a communication area of said master phone when frame synchronism with said master phone is established, and that said slave phone is outside of said communication area when said frame synchronism is not established.

6. The cordless telephone system according to claim 1, wherein said unique word generator generates a first code based on a prescribed correspondence to said ID code and adds a prescribed code to the generated first code to generate a unique word.

7. The cordless telephone system according to claim 2, wherein said unique word generator generates a first code based on a prescribed correspondence to said ID code and adds a prescribed code to the generated first code to generate a unique word.

8. The cordless telephone system according to claim 3, wherein said unique word generator generates a first code based on a prescribed correspondence to said ID code and adds a prescribed code to the generated first code to generate a unique word.

9. The cordless telephone system according to claim 4, wherein said unique word generator generates a first code based on a prescribed correspondence to said ID code and adds a prescribed code to the generated first code to generate a unique word.

10. A method of independently generating a unique word for simultaneous execution of synchronism and ID verification by each master and slave phone of a cordless telephone system comprising the steps of:

(a) reading an ID code from a memory;

(b) multiplying said ID code by a coefficient in a generation polynomial;

(c) combining a prescribed code with the result of said multiplication of step (b); and (d) generating a result of said combination of step (c) as said unique word for simultaneous execution of synchronism and ID verification.

11. The method of independently generating a unique word according to claim 10, wherein said generation polynomial (G(x)) is $G(x)=x^6+x+1$.

* * * * *